(12) United States Patent
Ahn et al.

(10) Patent No.: US 8,947,622 B2
(45) Date of Patent: Feb. 3, 2015

(54) APPARATUS AND METHOD OF FABRICATING ALIGNMENT LAYER FOR LIQUID CRYSTAL DISPLAY USING A NANO PATTERN MOLD

(75) Inventors: Han-Jin Ahn, Seoul (KR); Han-Shin Hwang, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 211 days.

(21) Appl. No.: 12/654,421

(22) Filed: Dec. 18, 2009

(65) Prior Publication Data

US 2011/0051066 A1 Mar. 3, 2011

(30) Foreign Application Priority Data

Aug. 26, 2009 (KR) ........................ 10-2009-0079137

(51) Int. Cl.
*G02F 1/1337* (2006.01)
*G02F 1/13* (2006.01)

(52) U.S. Cl.
CPC *G02F 1/13378* (2013.01); *G02F 2001/133765* (2013.01); *G02F 2202/36* (2013.01)
USPC .......................................... 349/124; 349/187

(58) Field of Classification Search
USPC .................................................. 349/124, 187
See application file for complete search history.

(56) References Cited

U.S. PATENT DOCUMENTS

| 2004/0150141 | A1* | 8/2004 | Chao et al. ..................... 264/494 |
| 2005/0221009 | A1 | 10/2005 | Clemons |
| 2006/0035086 | A1 | 2/2006 | Amos et al. |
| 2006/0290856 | A1* | 12/2006 | Lim .............................. 349/125 |
| 2008/0049180 | A1* | 2/2008 | Kim .............................. 349/126 |

FOREIGN PATENT DOCUMENTS

TW 1247794 1/2006

* cited by examiner

*Primary Examiner* — Lauren Nguyen
(74) *Attorney, Agent, or Firm* — McKenna Long & Aldridge LLP (57) ABSTRACT

Disclosed are an apparatus and method for fabricating an alignment layer for liquid crystal displays, capable of shortening process time, preventing scratches of alignment layers and decreasing black luminance. The method includes coating an alignment agent on a substrate, arranging a nano pattern mold with a groove and a protrusion to contact the alignment agent, pre-curing the alignment agent, separating the nano pattern mold from the alignment agent, and hard-curing the alignment agent separated from the nano pattern mold to form an alignment layer.

10 Claims, 13 Drawing Sheets

APPARATUS AND METHOD OF FABRICATING ALIGNMENT LAYER FOR LIQUID CRYSTAL DISPLAY USING A NANO PATTERN MOLD

This application claims the benefit of Korean Patent Application No. 2009-0079137, filed on Aug. 26, 2009, which is hereby incorporated by reference for all purposes as if fully set forth herein.

BACKGROUND OF THE INVENTION

1. Field of the Invention

The present invention relates to an apparatus and method for fabricating an alignment layer for liquid crystal displays, capable of shortening process time, and preventing scratches of alignment layers and decreasing black luminance.

2. Discussion of the Related Art

In general, liquid crystal displays control light transmission of liquid crystals using an electric field to display an image. Such a liquid crystal display comprises a thin film transistor substrate and a color filter substrate, which face each other; and liquid crystals interposed therebetween.

The thin film transistor substrate comprises a gate line and a data line which intersect each other, a thin film transistor arranged at the intersection of the gate line and the data line, a pixel electrode connected to the thin film transistor, and a lower alignment layer formed to align a liquid crystal.

The color filter substrate comprises a color filter to render color, a black matrix to prevent light leakage, a common electrode to form an electric field with the pixel electrode, and an upper alignment layer formed thereon.

Figure 1:
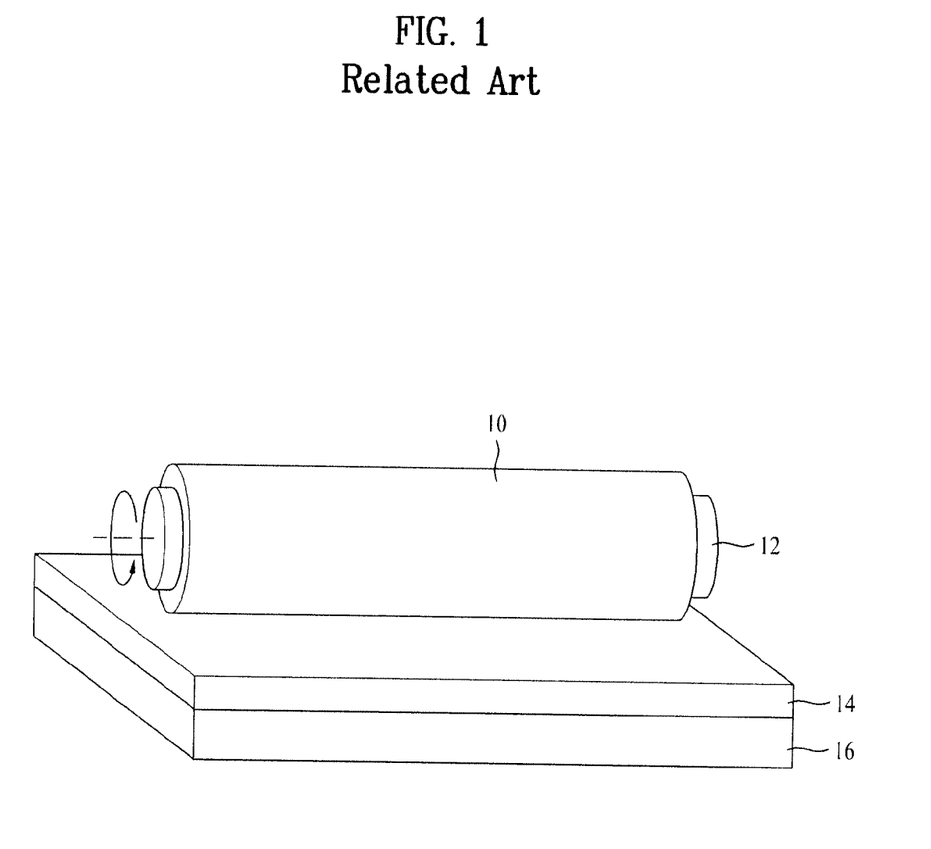
FIG. 1 is a perspective view illustrating a conventional method for fabricating an alignment layer for liquid crystal displays.

FIG. 1 is a perspective view illustrating a conventional method for fabricating an alignment layer for liquid crystal displays. As shown in FIG. 1, the conventional upper or lower alignment layer 14 is rubbed by rotating a rubbing roller 12, around which a rubbing cloth 10 is wound, on an organic polymer which is material of the alignment layer on a substrate 16.

As such, foreign materials or static electricity are generated in a region where the alignment layer 14 comes in contact with the rubbing cloth 10. These foreign materials remain on the alignment layer 14, causing display defects, such as spots. Meanwhile, the static electricity may cause breakage of thin films and thin film transistors.

In addition, liquid crystals are non-uniformly aligned in regions of the alignment layer 14 scratched by the rubbing cloth 10 and are non-uniformly aligned in regions where the rubbing cloth 10 does not contact the alignment layer 14 due to step coverage formed by a plurality of thin films arranged under the alignment layer 14. This non-uniform alignment induces light leakage, increasing black luminance and deteriorating contrast characteristics of liquid crystal displays.

Furthermore, when such an alignment layer is formed to large-area panels, uniform control of the rubbing roller 12 becomes difficult, thus preventing realization of uniform alignment of liquid crystals.

SUMMARY OF THE INVENTION

Accordingly, the present invention is directed to an apparatus and method for fabricating an alignment layer for liquid crystal displays that substantially obviate one or more problems due to limitations and disadvantages of the related art.

It is one object of the present invention to provide an apparatus and method for fabricating an alignment layer for liquid crystal displays, capable of shortening process time, preventing scratches of alignment layers and decreasing black luminance.

To achieve these objects and other advantages and in accordance with the purpose of the invention, as embodied and broadly described herein, provided is a method for fabricating an alignment layer for liquid crystal displays including: coating an alignment agent on a substrate; arranging a nano pattern mold with a groove and a protrusion to contact the alignment agent; pre-curing the alignment agent; separating the nano pattern mold from the alignment agent; and hard-curing the alignment agent separated from the nano pattern mold, to form an alignment layer.

In accordance with another aspect, provided is an apparatus for fabricating an alignment layer for liquid crystal displays, including: a coating device to coat an alignment agent on a substrate; a nano pattern mold having a groove and a protrusion which is allowed to contact the alignment agent; a hot plate to pre-cure the alignment agent; and a baking oven to hard-cure the alignment agent separated from the nano pattern mold to form an alignment layer.

The alignment agent may be thermosetting alignment agent, such as thermosetting polyimide.

The thermosetting polyimide may contain a solvent in an amount of 90 to 98%, based on the total weight thereof.

The alignment agent may be coated to a thickness of 100 to 300 nm on the substrate.

The groove of the nano pattern mold may have a depth of 10 to 100 nm, and the protrusion of the nano pattern mold may have a pitch of 100 to 1,000 nm.

The nano pattern mold may be in the form of a square or sine wave.

The step of pre-curing may include: allowing the nano pattern mold and the alignment agent to be kept at ambient temperature and pressure for 0 to 20 minutes, while the nano pattern mold contacts the alignment agent; and pre-curing the alignment agent in contact with the nano pattern mold on a hot plate at about 100 to 120☐ about for 1 to 20 minutes.

The alignment agent may comprise a protrusion pattern reverse-transcribed from the groove of the nano pattern mold, and a groove pattern reverse-transcribed from the protrusion of the nano pattern mold.

The hard-curing may be carried out in a baking oven at a temperature of 230☐ to 250☐ for 15 to 120 minutes.

The nano pattern mold may be made of a hydrophobic thermosetting rubber polymer having a contact angle of 100 to 120 degrees.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, preferred embodiments of the present invention will be described in detail with reference to the accompanying drawings.

Figure 2:
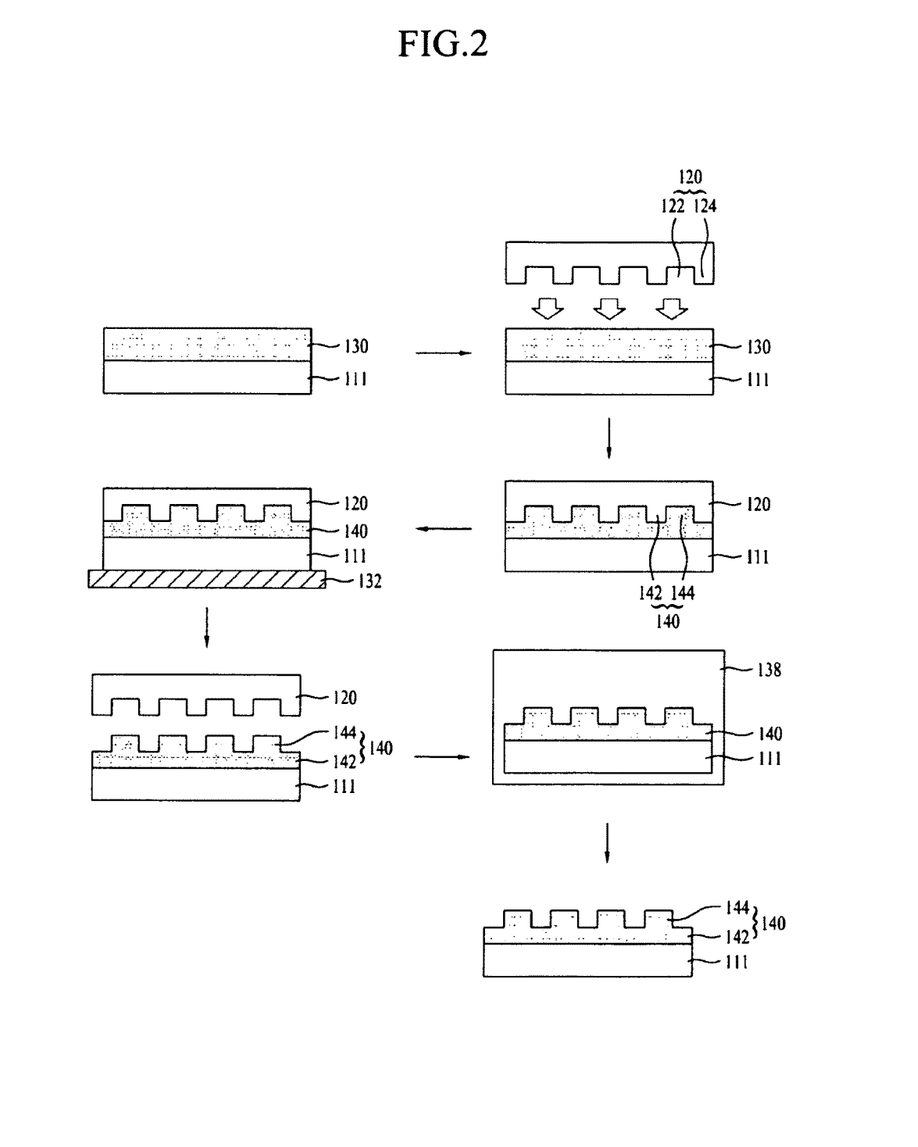
FIG. 2 is sectional views illustrating a method for fabricating an alignment layer for liquid crystal displays according to one embodiment of the present invention.

FIG. 2 is a flow chart illustrating a method for fabricating an alignment layer for liquid crystal displays according to one embodiment of the present invention. FIGS. 3A to 3G are perspective views illustrating a method for fabricating an alignment layer for liquid crystal displays according to the present invention in detail. The method for fabricating the alignment layer of the liquid crystal displays will be described in detail with reference to FIG. 2 and FIGS. 3A to 3F.

Figure 3A:
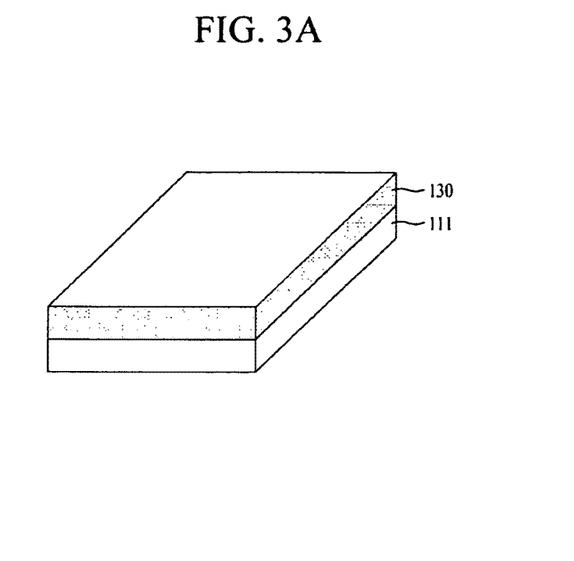
FIGS. 3A to 3G are perspective views illustrating a method for fabricating an alignment layer for liquid crystal displays according to the present invention in detail.

As shown in FIGS. 2 and 3A, an alignment agent 130 is coated to a substrate 111 by a method such as spin or spinless coating. For example, the alignment agent 130 is formed to a thickness of about 100 to 300 nm. In the case wherein the thickness of the alignment agent 130 is less than 100 nm, when a nano pattern mold 120 (which will be described in detail below) contacts the alignment agent 130, some portions of the alignment agent 130 are depressed by the nano pattern mold 120. The depressed press causes formation of openings in the portions of the alignment agent 130 depressed by the nano pattern mold 120. The openings in the alignment agent 130 expose the thin film under the alignment agent 130. The exposed thin film is directly in contact with the liquid crystal, thereby deteriorating liquid crystal protection capability. When the thickness of the alignment agent 130 exceeds 300 nm, the distance between electrodes to operate liquid crystals, i.e., common and pixel electrodes, increases, thus increasing a liquid crystal operation voltage.

In addition, the alignment agent 130 according to the present invention is made of polyimide as a thermosetting alignment agent exhibiting superior operation and alignment stability, as compared to a photosetting alignment agent.

More specifically, the thermosetting alignment agent 130 contains considerably more benzene rings, as compared to photosetting alignment agents such as acrylate. The benzene groups of the thermosetting alignment agent 130 induce Van der Waal's interaction with benzene groups present in liquid crystals, thus maintaining strong alignment stability.

In addition, the solvent in the thermosetting alignment agent 130 occupies 90% to 98% of the total weight of the thermosetting alignment agent 130, which is higher than the photosetting alignment agent. In this case, by applying a hard-curing process to the thermosetting alignment agent 130 for vaporizing the solvent therein, the thickness of the layer made of the thermosetting alignment agent 130 is several times lower than that of photosetting alignment agents, thus decreasing a driving voltage and improving operation stability.

In addition, the glass transition temperature (Tg) of the thermosetting alignment agent 130 is higher than the heat-resistance temperature of liquid crystal panels, while the glass transition temperature (Tg) of photosetting alignment agents is lower than the heat-resistance temperature of liquid crystal panels. For example, the heat-resistance temperature of liquid crystal panels is about 100 to 150□, the glass transition temperature (Tg) of the photosetting alignment agent (e.g., polymethylmethacrylate (PMMA)) is about 90 to 100□, and the glass transition temperature (Tg) of the thermosetting alignment agent 130 (e.g., polyimide) is about 350 to 400□.

In this case, the alignment layer made of the thermosetting alignment agent 130 maintains its original patterns even under harsh conditions of liquid crystal panels (e.g., when the temperature reaches the heat-resistance temperature of liquid crystal panels). Then the liquid crystals are normally aligned on the alignment layer maintaining its original patterns, thus enabling liquid crystals to operate smoothly. On the other hand, the alignment layer made of photosetting alignment agents undergoes variation of its patterns under harsh conditions of liquid crystal panels (e.g., when the temperature reaches the heat-resistance temperature of liquid crystal panels). Then the liquid crystals are not normally aligned on the alignment layer undergoing variation of its original patterns, thus preventing liquid crystals from smoothly operating.

Figure 3B:
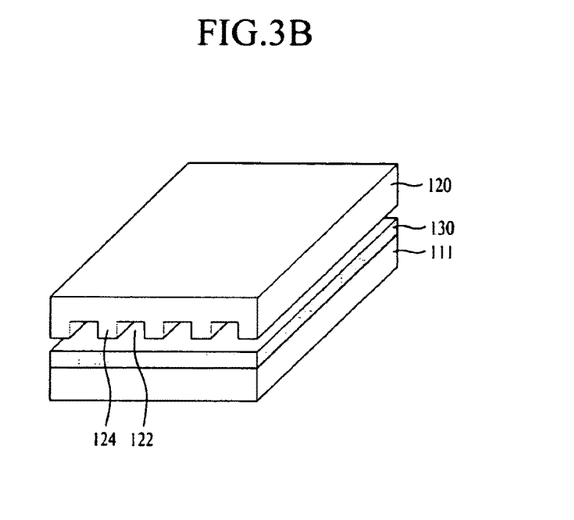

As shown in FIGS. 2 and 3B, a nano pattern mold 120 is arranged on the substrate 111 provided with the thermosetting alignment agent 130.

Figure 4:
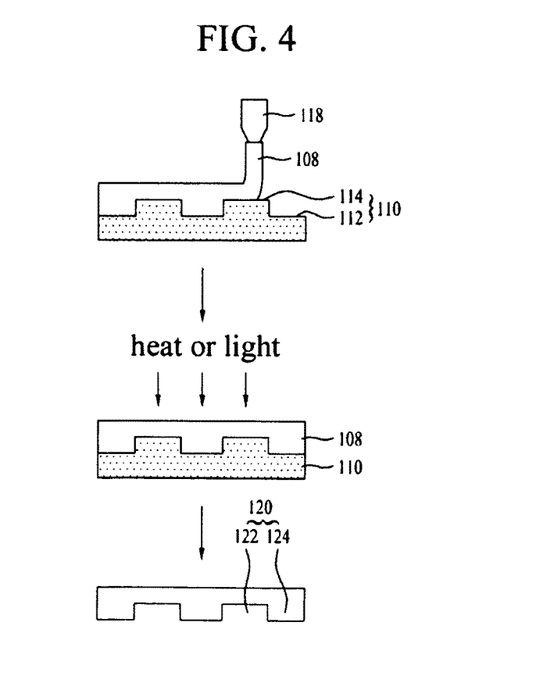
FIG. 4 is a view illustrating a method for fabricating a nano pattern mold shown in FIGS. 2 and 3B.

The nano pattern mold 120 is formed by providing a master 110 provided with a groove 112 and a protrusion 114 on a quartz or silicon wafer (Si wafer) substrate by a method such as e-beam lithography or holographic lithography, as shown in FIG. 4, coating a polymer 108 with rubbery properties on the master 110 using a coating device (e.g., a printer) 118, subjecting the resulting master 110 to thermosetting or photosetting, and reverse-transcribing the groove 112 and the protrusion 114 of the master 110 on the polymer 108.

As a result, the nano pattern mold 120 comprises a groove 122 corresponding to the protrusion 114 of the master 110 and a protrusion 124 corresponding to the groove 112 of the master 110. In addition, the nano pattern mold 120 is made of a rubber polymer 108, in particular, of polydimethylsiloxane (PDMS) capable of efficiently absorbing a solvent in a solvent-rich thermosetting alignment agent 130.

Figure 3C:
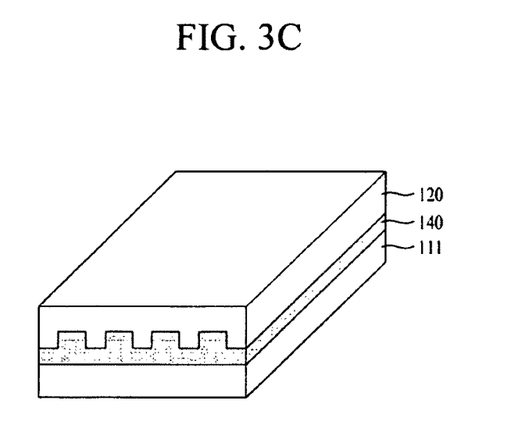

As shown in FIGS. 2 and 3C, the nano pattern mold 120 contacts the alignment agent 130. The alignment agent 130 coming in contact with the nano pattern mold 120 is kept at ambient temperature/pressure for about 0 to 20 minutes. At this time, the stand-by period lengthens, as the thickness of the alignment agent 130 increases. The stand-by period indicates the time for keeping the nano pattern mold 120 contact with the alignment agent 130. As a result, the solvent present in the alignment agent 130 permeates the surface of the nano pattern mold 120 and the alignment agent 130 moves into the groove 122 of the nano pattern mold 120 to form an alignment layer 140. As shown in FIGS. 3E and 4, the alignment layer 140 comprises a protrusion pattern 144 reverse-transcribed from the groove 122 of the nano pattern mold 120, and a groove pattern 142 reverse-transcribed from the protrusion 124 of the nano pattern mold 120.

Figure 3D:
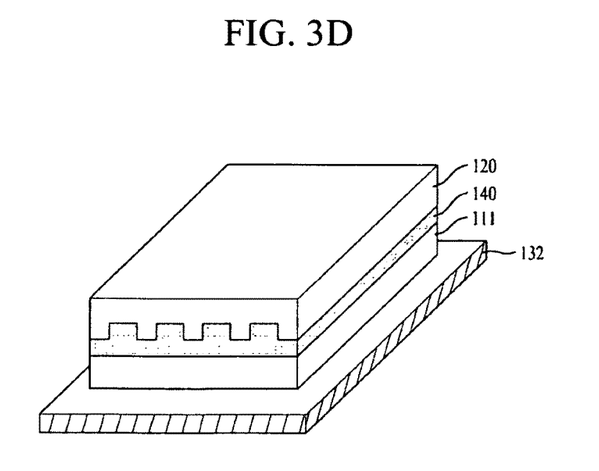
Figure 3E:
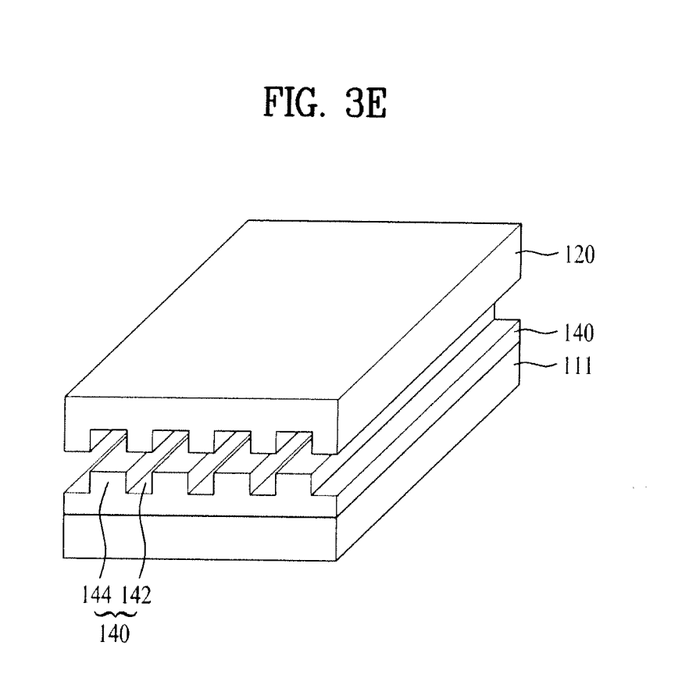

As shown in FIGS. 2 and 3D, the alignment layer 140 coming in contact with the nano pattern mold 120 is pre-cured on a hot plate 132 at a temperature of 100□ to 120□ for about 1 to 20 minutes. During the pre-curing process, the solvent in the alignment layer 140 is evaporated. Since the hot plate 132 is in the form of a conveyor belt, in which heat wires are embedded, the substrate 111 provided with the alignment layer 140 is procured and then transferred to a subsequent process in an in-line manner.

In accordance with the present invention, the pre-curing is performed after the nano pattern mold 120 contacts the alignment layer 140, thus simplifying the overall process and preventing the alignment layer 140 from being torn, when compared to the conventional case where the contact is performed after the pre-curing.

More specifically, in the conventional case where the alignment layer is precured and then comes in contact with the nano pattern mold, it is partially cured in the process of precuring. For this reason, the nano pattern mold is inevitably compressed at a strong pressure of 3,000 to 15,000 N/cm$^2$ in order to pattern the alignment layer. In addition, additional compressing equipment is required for such a compression process, thus increasing costs and complicating a process. Also, the strong pressure of the compressing equipment leads is to tear of the layer made of the alignment agent.

On the other hand, in accordance with the present invention, in the case where the alignment layer 140 comes in contact with the nano pattern mold 120 and is then precured, the alignment layer 140 contacted with the nano pattern mold 120 is not yet cured and can be thus patterned only under the inherent pressure of the nano pattern mold 120 without an additional compression process.

Accordingly, the present invention eliminates the necessity of additional compression equipment, thus leading to reduced costs and simplified process and preventing a conventional problem, namely, tearing of the alignment layer due to strong pressures.

As shown in FIGS. 2 and 3E, the nano pattern mold 120 is separated from the alignment layer 140.

Figure 3F:
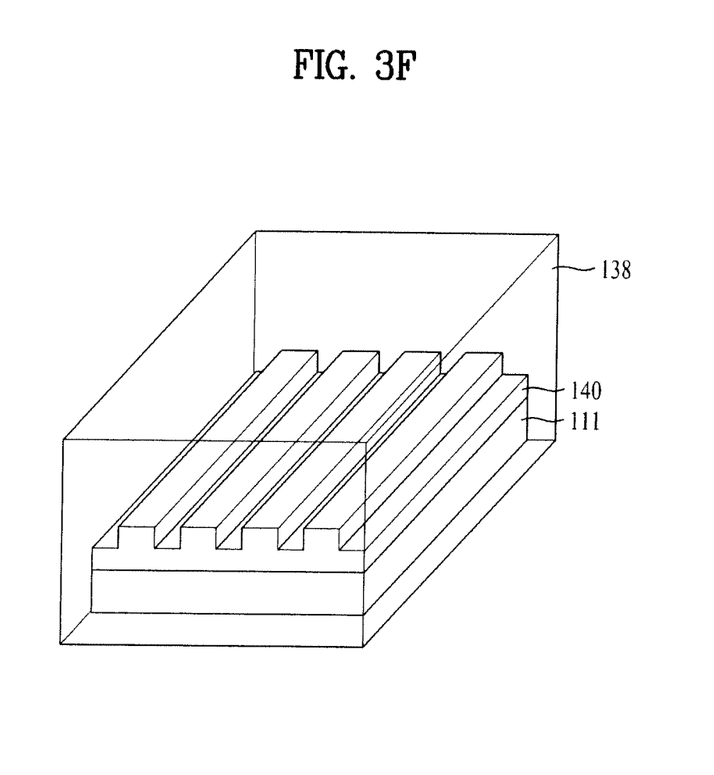

As shown in FIGS. 2 and 3F, the alignment layer 140 separated from the nano pattern mold 120 is hard-cured in a baking oven 138 at 230 to 250° higher than the procuring temperature for about 15 to 120 minutes to perform imidation.

As such, in accordance with the present invention, the alignment layer 140 is separated from the nano pattern mold 120 and then hard-cured, thus reducing the overall process time and improving process efficiency.

More specifically, in the conventional case wherein the nano pattern mold is hard-cured and is then separated from the alignment layer, the nano pattern mold contacts the alignment layer during the hard-curing. Accordingly, the nano pattern mold should also be accepted in the baking oven for performing the hard-curing and the baking oven should thus have a large size. In addition, while the nano pattern mold contacts the alignment layer, the substrate is accepted in the baking oven together with the nano pattern molds, thus requiring the same number of nano pattern molds as the whole number of the substrates. For this reason, process cost is increased and process efficiency is deteriorated.

On the other hand, in accordance with the present invention, the alignment layer 140 is separated from the nano pattern mold 120 and is then hard-cured, thus allowing the substrate 111 separated from the nano pattern mold 120 to be accepted in the baking oven 138 and reducing the size of the baking oven, as compared to conventional cases. In addition, the alignment layers 140 formed on a plurality of substrates 111 using a single nano pattern mold 120 are patterned and then separated from the nano pattern mold 120, thus allowing a plurality of substrates 111 independent of the nano pattern mold 120 to be accepted in a cassette and then simultaneously baked in baking oven 138. As a result, the number of nano pattern molds 120 is decreased, reducing process costs and improving process efficiency.

In addition, the nano pattern mold 120 is made of a hydrophobic thermosetting rubber polymer which has a contact angle of 100 to 120 degrees under ambient conditions. In this case, the adhesion strength between the alignment layer 140 and the hydrophobic nano pattern mold 120, that contact each other, is lower than the adhesion strength between the alignment layer 140 and the thin film arranged thereunder. Accordingly, although separated from the mold prior to hard-curing, the alignment layer 140 can maintain its original patterns, i.e., the groove pattern 142 and protrusion pattern 144.

Figure 3G:
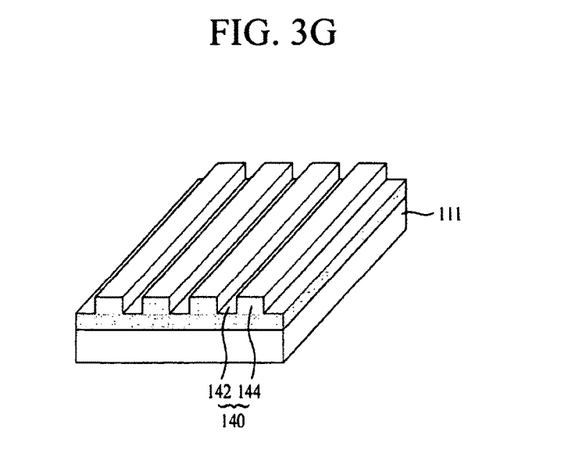

As shown in FIGS. 2 and 3G, the substrate 111 provided with the alignment layer 140 is removed from the baking oven 138 to complete manufacturing of the alignment layer.

As such, the present invention comprises coating an alignment agent, pre-curing using a nano pattern mold and hard-curing to form an alignment layer. As a result, the method of the present invention allows the manufacturing period of the alignment layer to be shortened. In addition, the present invention uses thermosetting polyimide to form the alignment layer, thus improving liquid crystal operation stability, as compared to photosetting alignment layers. Furthermore, the present invention eliminates the necessity of additional compression equipment and process to pattern the alignment agent using the nano pattern mold, thus enabling simplified process and shortend process time.

Figure 5A:
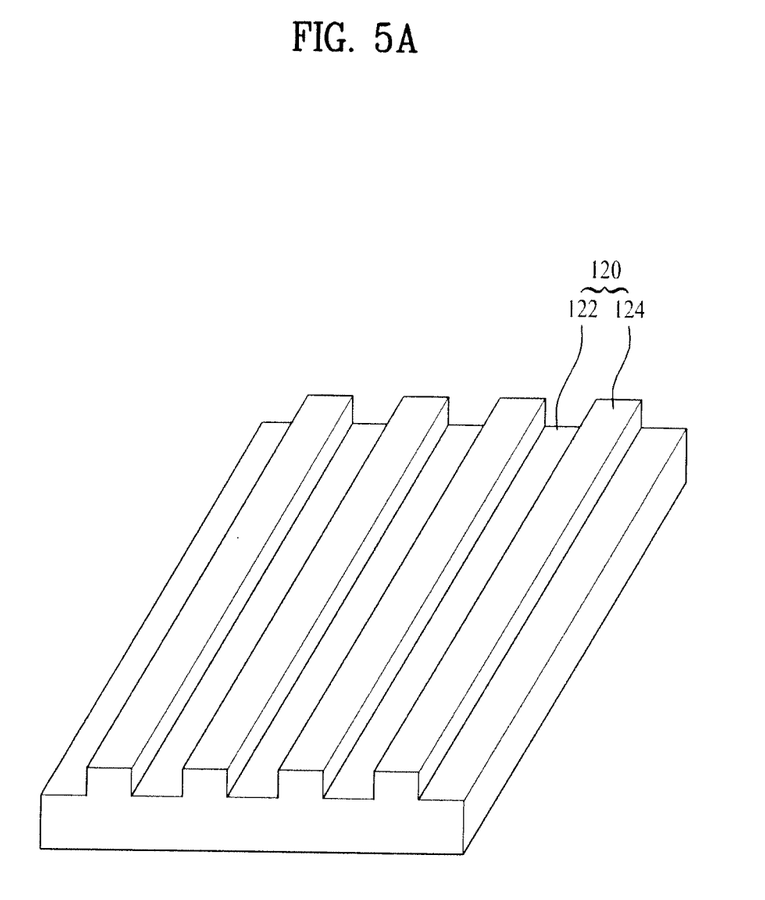
FIGS. 5A and 5B are perspective views illustrating various shapes of the nano pattern mold shown in FIGS. 2 and 3B.
Figure 5B:
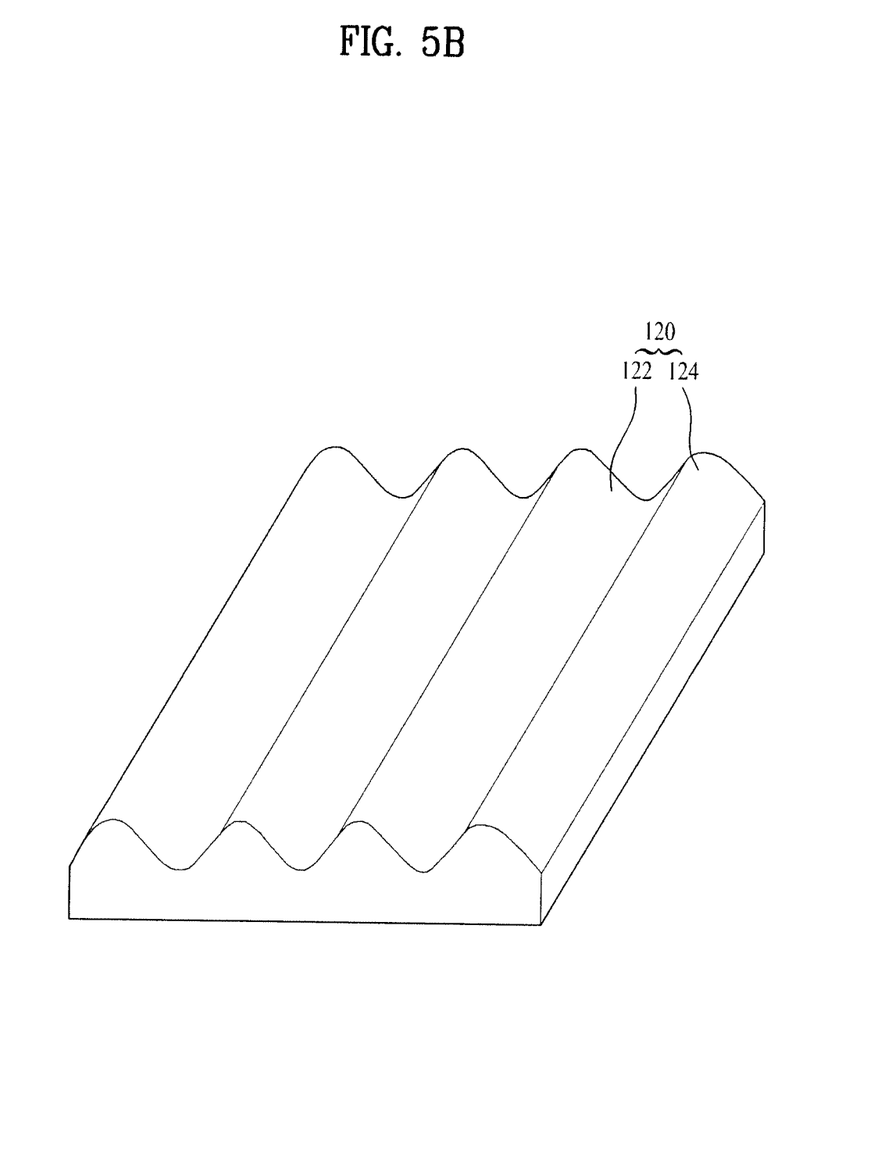

Meanwhile, the nano pattern mold 120 for forming the alignment layer 140 is in the form of a square wave, as shown in FIGS. 3B and 5A, or a sign wave as shown in FIG. 5B.

In addition, the groove 122 of the nano pattern mold 120 has a depth of 10 to 100 nm, and the protrusion 124 has a pitch of 100 to 1,000 nm. The depth D of the groove pattern 142 of the alignment layer 140 formed by using such the nano pattern mold 120 is smaller than the depth (i.e., 10 to 100 nm) of the groove 122 of the nano pattern mold 120, as shown in FIG. 6A, and the pitch P of the protrusion pattern 144 is smaller than the pitch (i.e., 100 to 1,000 nm) of the protrusion 124 of the nano pattern mold 120.

Figure 6A:
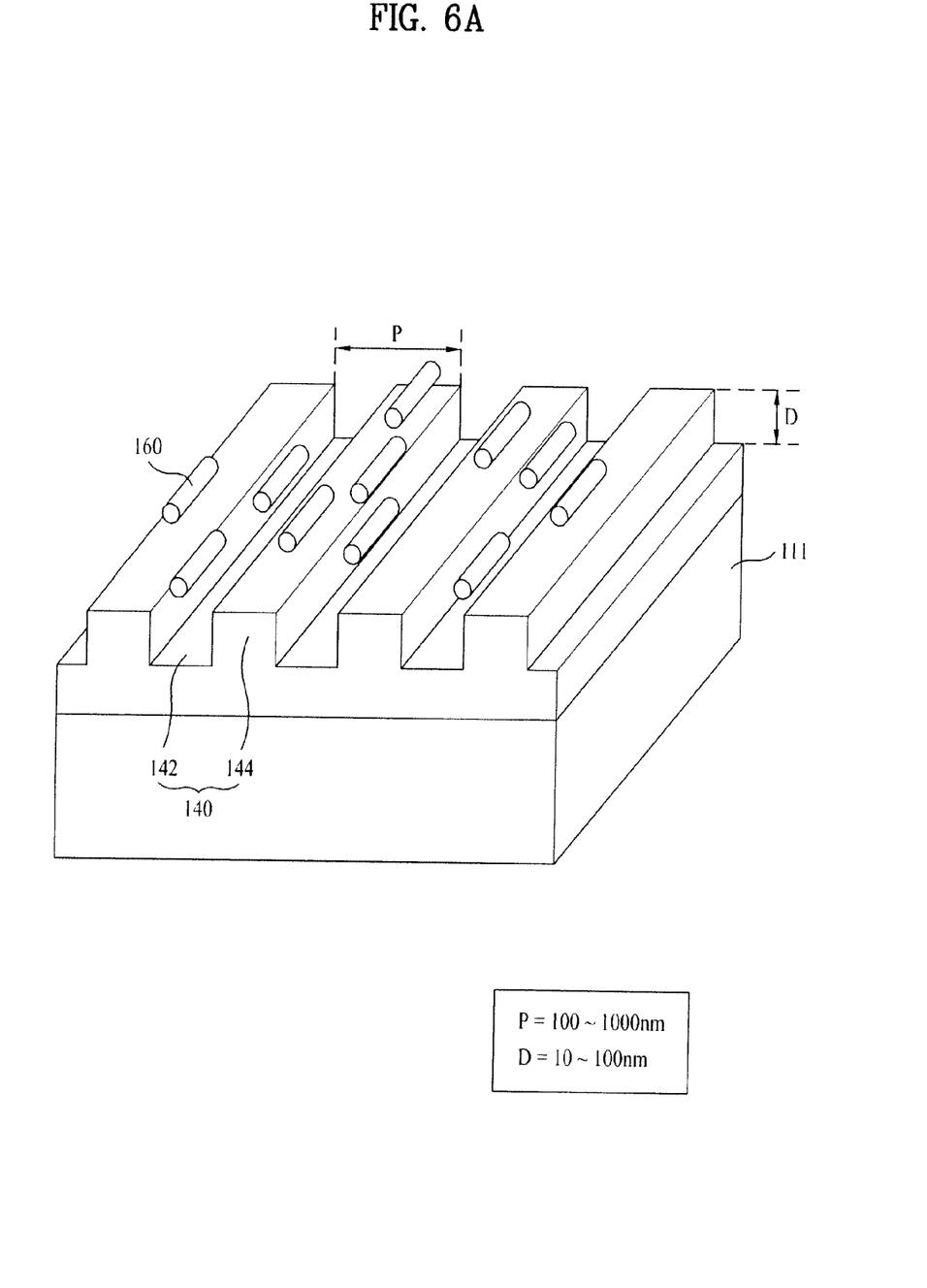
FIGS. 6A and 6B are views illustrating the alignment state of liquid crystals formed using the alignment layer formed with the nano pattern mold according to the present invention.
Figure 6B:
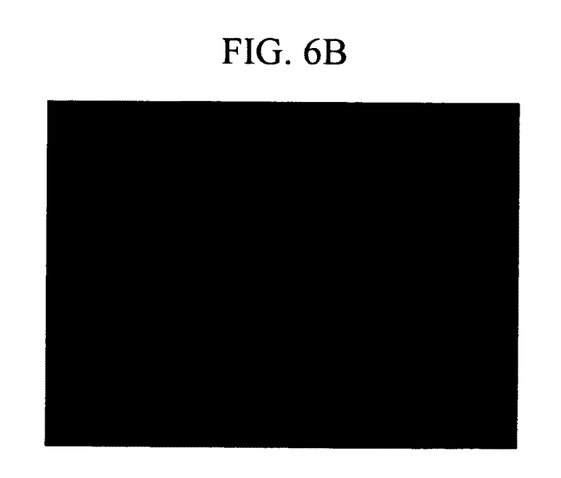

A liquid crystal 160 is normally aligned in a longitudinal direction of the groove pattern 142 of the alignment layer 140 on the alignment layer 140, as shown in FIG. 6A, thus obtaining the desired black luminance, as shown in FIG. 6B and Table 1.

TABLE 1

|  | Pitch of protrusion pattern (P)/ depth of groove pattern (D) | | | |
| --- | --- | --- | --- | --- |
|  | 200 nm(P)/ 10 nm(D) | 400 nm(P)/ 30 nm(D) | 1000 nm(P)/ 40 nm(D) | 2000 nm(P)/ 70 nm(D) |
| Alignment of liquid crystal | Good | Good | Good | Bad (light leakage) |

On the other hand, when the groove 122 of the nano pattern mold 120 has a depth less than 10 nm, the protrusion pattern 144 of the alignment layer 140 is incompletely formed, and when the groove 122 of the nano pattern mold 120 exceeds 100 nm, the alignment layer 140 cannot be protruded to a maximum height of the groove 122 of the nano pattern mold 120, making it impossible to form the protrusion pattern 144 of the alignment layer 140 to a desired level.

Figure 7A:
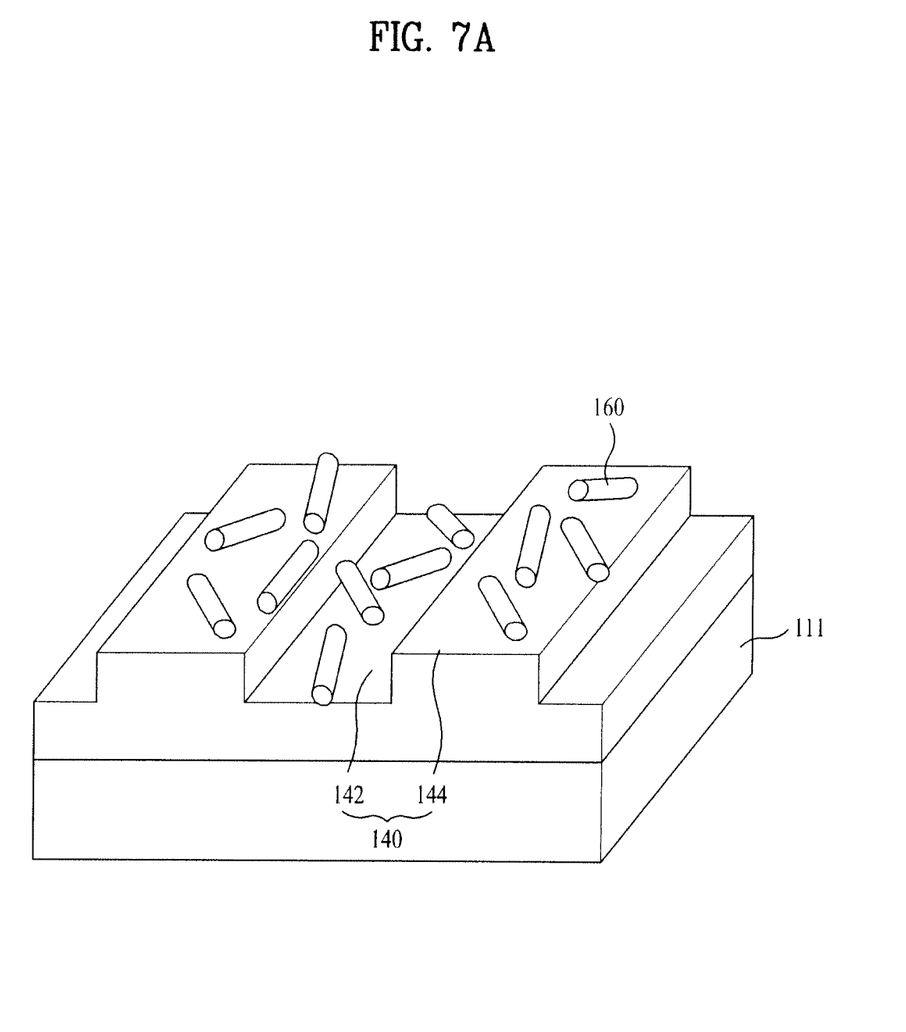
FIGS. 7A and 7B are views illustrating the alignment state of liquid crystals formed using an alignment layer formed using the nano pattern mold wherein the pitch of the protrusion pattern is out of the range defined in the present invention.
Figure 7B:
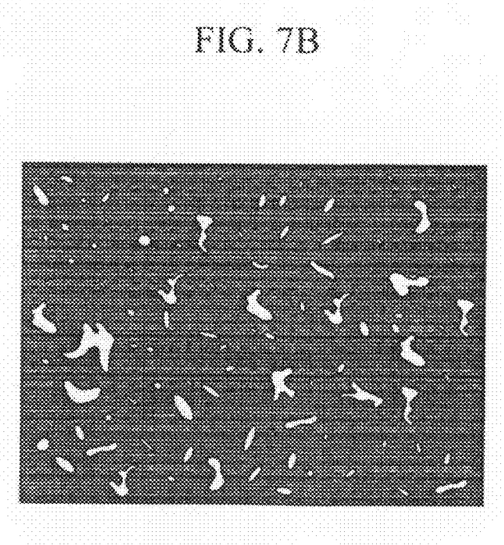

In addition, when the protrusion 124 of the nano pattern mold 120 has a pitch less than 100 nm, the alignment layer 140 is incompletely patterned, and when the protrusion 124 of the nano pattern mold 120 has a pitch larger than 1,000 nm, liquid crystals are not desiredly aligned on the groove pattern 142 of the alignment layer 140 formed using the nano pattern mold 120. That is, when the protrusion 124 of the nano pattern mold 120 has a pitch larger than 1,000 nm, the groove pattern 142 of the alignment layer 140 has an increased width, thus causing random alignment of the crystal liquid 160, rather than in a longitudinal direction, as shown in FIG. 7A. This causes undesired alignment of the liquid crystal, causing light leakage and making it impossible to obtain desired black brightness, as shown in FIG. 7A and Table 1.

Accordingly, in accordance with the present invention, the nano pattern mold 120 to form the alignment layer 140 is formed such that it comprises a groove 122 with a depth of 10 to 100 nm and a protrusion 124 with a pitch of 100 to 1,000 nm.

The anchoring energy of the alignment layer 140 formed using such a nano pattern mold 120 is varied depending on the pitch and depth of the surface thereof, as depicted in the following Equation I. That is, anchoring energy increases, as the groove pattern 142 of the alignment layer 140 becomes deeper or the pitch of the protrusion pattern 144 becomes smaller.

$$A_E = \frac{1}{2}KD^2q^3 \qquad (I)$$

In Equation I, $A_E$ is anchoring energy, D is a depth of groove of the alignment layer, and q is $2\pi/$(pitch of the protrusion of alignment layer).

The anchoring energy of the alignment layer calculated by Equation I is relatively high, as can be seen from Table 2.

TABLE 2

| | | Depth (nm) | | | | |
|---|---|---|---|---|---|---|
| | | 10 | 30 | 50 | 70 | 100 |
| Pitch (nm) | 200 | $3.9 \times 10^{-7}$ | $3.5 \times 10^{-6}$ | $9.7 \times 10^{-6}$ | $1.9 \times 10^{-5}$ | $3.9 \times 10^{-5}$ |
| | 400 | $4.8 \times 10^{-8}$ | $4.4 \times 10^{-7}$ | $1.2 \times 10^{-6}$ | $2.4 \times 10^{-6}$ | $4.8 \times 10^{-6}$ |
| | 600 | $3.1 \times 10^{-9}$ | $2.8 \times 10^{-8}$ | $7.8 \times 10^{-8}$ | $1.5 \times 10^{-7}$ | $3.1 \times 10^{-7}$ |

From Table 2, it can be confirmed that the alignment of the alignment layer is directly proportional to this anchoring energy, thus improving alignment of liquid crystals due to the alignment layer 140 having the depth of the groove pattern 142 and the pitch of the protrusion pattern 144 within the range defined herein.

Figure 8:
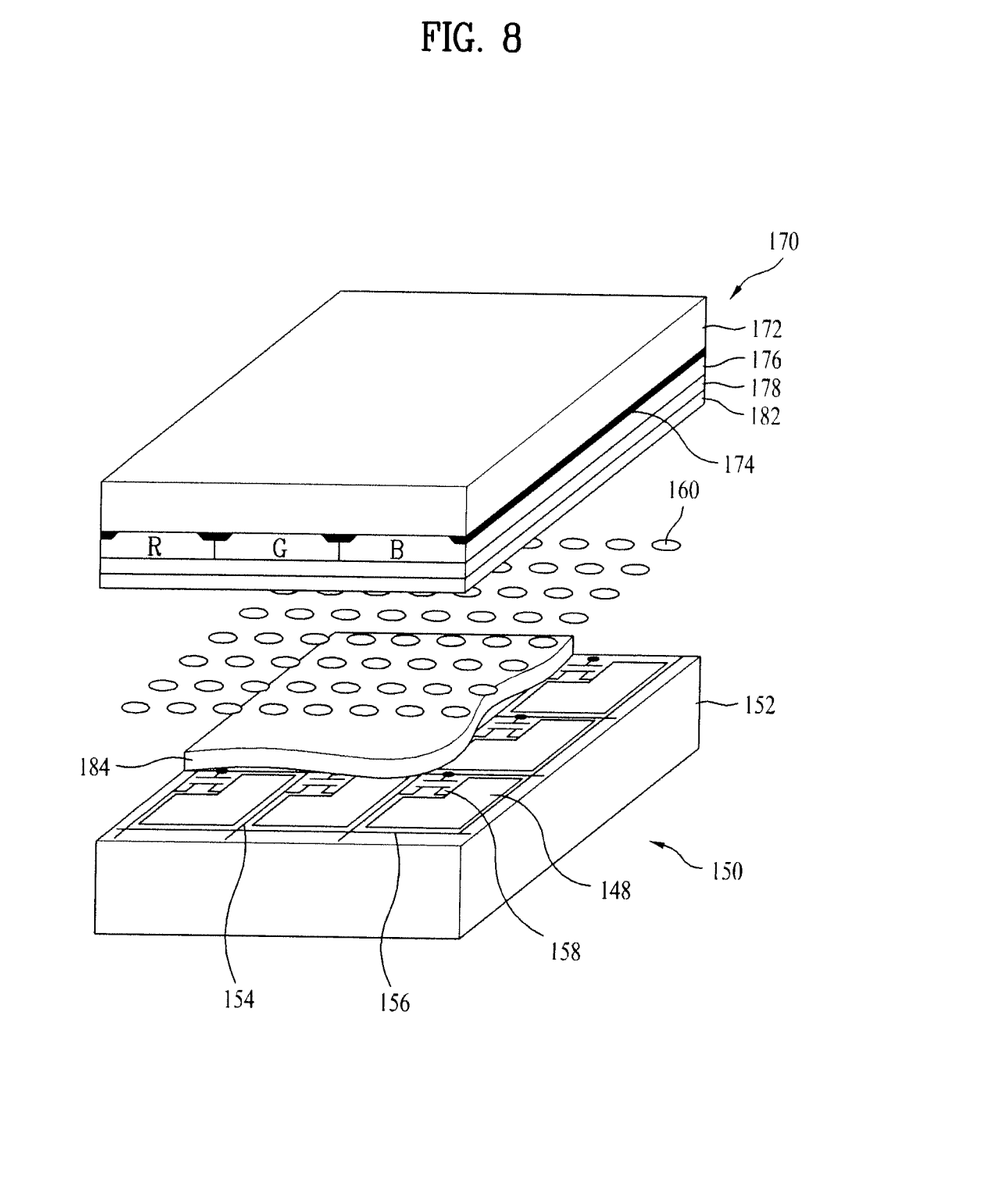
FIG. 8 is a perspective view illustrating a liquid crystal panel comprising upper and lower alignment layers formed by the method shown in FIG. 2 and FIGS. 3A to 3G.

Meanwhile, the alignment layer of the present invention is applied to the liquid crystal panel shown in FIG. 8. Specifically, the liquid crystal panel shown in FIG. 8 comprises the thin film transistor substrate 150 and the color filter substrate 170 that face each other.

The color filter substrate 170 comprises a black matrix 174 to prevent light leakage, a color filter 176 to render color arranged on an upper substrate 172, a common electrode 178 to form an electric field with the pixel electrode, and a column spacer (not shown) to maintain a cell gap, and an upper alignment layer 182 to cover the resulting structure.

The thin film transistor substrate 150 comprises a gate line 156 and a data line 154 that intersect each other on the lower substrate 152, a thin film transistor 158 arranged adjacent to the intersection of the gate line 156 and the data line 154, a pixel electrode 148 in a pixel region provided in the form of an intersection, and a lower alignment layer 184 to cover the resulting structure.

The components of the liquid crystal panel, i.e., the color filter 176, the black matrix 174, the column spacer (not shown), the thin film transistor 158, the gate line 156, the date line 154 and the pixel electrode 148 are formed by a patterning process using the afore-mentioned nano pattern mold with grooves corresponding to respective patterns.

In addition, the alignment layer 140 patterned using the nano pattern mold 120 according to the present invention may be applied to TN-mode liquid crystal panels wherein the pixel electrode 148 and the common electrode 178 are arranged on different substrates, as shown in FIG. 8, and IPS-mode liquid crystal panels wherein the pixel electrode 148 and the common electrode 178 are arranged in a single substrate. In addition, the alignment layer 140 may be applied to any liquid crystal panels requiring rubbing processes.

The present invention provides an apparatus and method for fabricating an alignment layer for liquid crystal displays, involving coating an alignment agent, pre-curing using a nano pattern mold and hard-curing to form an alignment layer. As a result, the formation of the alignment layer can be performed without additional processes and increased process time involved in conventional rubbing method. In addition, the present invention uses thermosetting polyimide to form the alignment layer, thus improving liquid crystal operation stability, as compared to photosetting alignment layers. Furthermore, the present invention eliminates the necessity of additional compression equipment and process to pattern the alignment agent using the nano pattern mold, thus enabling simplified process and shorten process time.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for fabricating an alignment layer for a liquid crystal display comprising:
    coating an alignment agent on a substrate;
    arranging a nano pattern mold with a groove and a protrusion to contact the alignment agent;
    pre-curing the alignment agent in contact with the nano pattern mold on a hot plate in the form of a conveyor belt;
    separating the nano pattern mold from the alignment agent to reverse transcribe the groove and protrusion of the nano pattern mold into the alignment agent into a reverse transcribed pattern;
    after separating the nano pattern mold from the alignment agent, conveying the substrate from the hot plate on the conveyor belt to a hard-curing apparatus in an in-line manner;
    hard-curing the alignment agent separated from the nano pattern mold to form an alignment layer to maintain the reverse transcribed pattern after separating the nano pattern mold from the alignment agent; and
    aligning liquid crystal in a longitudinal direction of the groove of a nano pattern of the alignment layer,
    wherein the step of pre-curing comprises:
        allowing the nano pattern mold and the alignment agent to be kept at ambient temperature and pressure for 1 to 20 minutes, while the nano pattern mold contacts the alignment agent; and pre-curing the alignment agent in contact with the nano pattern mold at a temperature of 100° to 120° for 1 to 20 minutes.

2. The method according to claim 1, wherein the alignment agent is thermosetting alignment agent.

3. The method according to claim 2, wherein the thermosetting alignment agent is thermosetting polyimide.

4. The method according to claim 2, wherein the thermosetting alignment agent contains a solvent in an amount of 90 to 98%, based on total weight thereof.

5. The method according to claim 1, wherein the thickness of the alignment agent is 100 to 300 nm.

6. The method according to claim 1, wherein the groove of the nano pattern mold has a depth of 10 to 100 nm, and the protrusion of the nano pattern mold has a pitch of 100 to 1,000 nm.

7. The method according to claim 1, wherein the nano pattern mold is in the form of a square or sine wave.

8. The method according to claim 1, wherein the alignment agent comprises a protrusion pattern reverse-transcribed from the groove of the nano pattern mold, and a groove pattern reverse-transcribed from the protrusion of the nano pattern mold.

9. The method according to claim 1, wherein the hard-curing is carried out in a baking oven at a temperature of 230° to 250° for 15 to 120 minutes.

10. The method according to claim 1, wherein the nano pattern mold is made of a hydrophobic thermosetting rubber polymer with a contact angle of 100 to 120 degrees.

* * * * *